No. 689,990. Patented Dec. 31, 1901.
R. A. REGESTER.
FLEXIBLE PIPE COUPLING.
(Application filed Mar. 8, 1901.)
(No Model.)
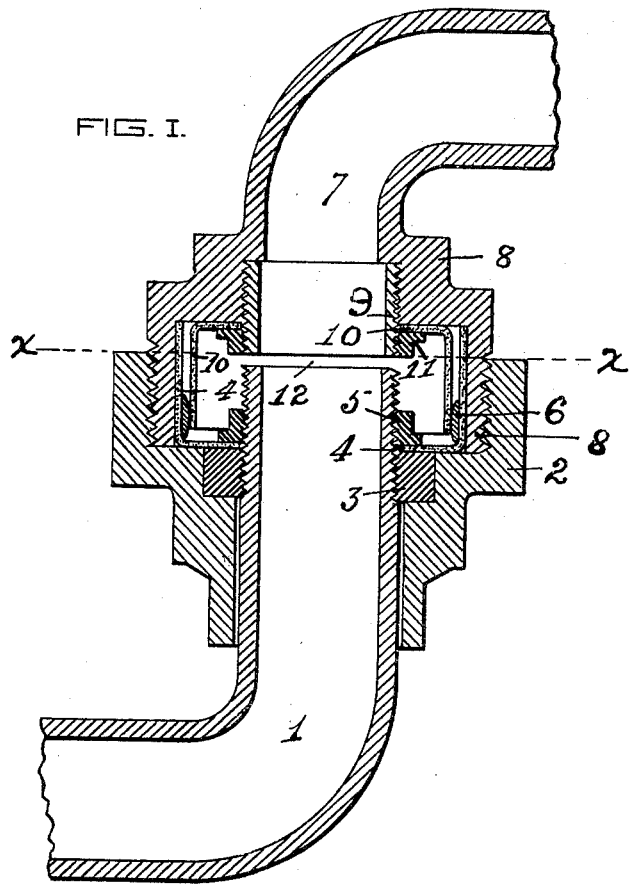
FIG. I.
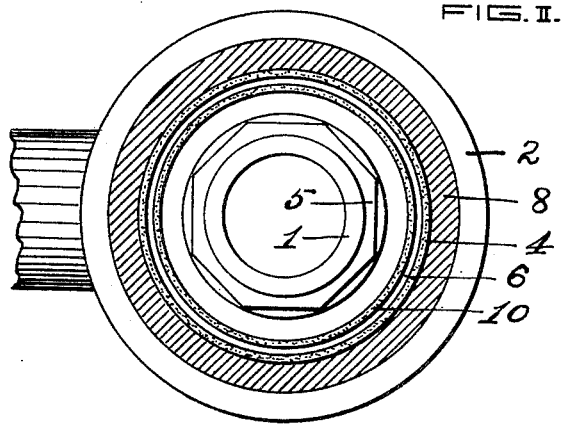
FIG. II.
WITNESSES
Henry C. Wagner
A. G. Decker.
INVENTOR
Robert A. Regester
BY
Robert Gipson
ATTORNEY.
THE NORRIS PETERS CO., PHOTO-LITHO., WASHINGTON, D. C.

UNITED STATES PATENT OFFICE.

ROBERT A. REGESTER, OF BALTIMORE, MARYLAND.

FLEXIBLE PIPE-COUPLING.

SPECIFICATION forming part of Letters Patent No. 689,990, dated December 31, 1901.

Application filed March 8, 1901. Serial No. 50,303. (No model.)

*To all whom it may concern:*

Be it known that I, ROBERT A. REGESTER, a citizen of the United States, residing at Baltimore, in the State of Maryland, have invented certain new and useful Improvements in Flexible Pipe-Couplings, of which the following is a specification.

This invention relates to pipe-couplings in which movable or flexible joints are provided; and it consists of concentric elastic packing rings or cups, one arranged within the other, whereby the fluid under pressure forces the inner cup against the outer one and the latter against the surrounding metal walls of the coupling, and means to reduce the friction between the cups to a minimum, whereby a tight joint is provided to prevent the fluid from escaping and at the same time permitting the parts to be freely turned, so as to afford a flexible joint between the different pipe-sections for various purposes in the art to which it pertains.

In the accompanying drawings, Figure 1 shows the coupling in section, and Fig. 2 is a sectional view of Fig. 1 on the line X X.

Like numerals refer to the same parts in the two views.

The numeral 1 designates the pipe, provided with a bend at one end and a thread at the other. On the threaded end is placed the female part 2 of the coupling. The nut 3 is then secured to the position shown, and the leather or other flexible material cup 4 is placed in position and the nut-washer 5 secured to its place to secure the cup 4 tightly in its position. Within the cup 4 is placed the antifriction-ring 6, which closely fits the inner surface of the cup 4. The section of the pipe 7 is secured to the male part 8 of the coupling, which latter is provided with the spud 9, either integral or of a separate piece, which is threaded and over which is placed the cup 10 and the latter secured to the spud by the nut-washer 11, so as to rigidly hold it to its place and form a fluid-tight joint therebetween. The parts are then placed together, with the cup 10 within the cup 4, with the antifriction-ring 6 placed between the two, and the male and female parts 2 and 8 of the coupling securely screwed together. The coupling is then ready for use, and as the fluid under pressure enters it, passing through the opening 12 between the pipes, forces the cup 10 against the cup 4 and the latter against the sides of the male part 8 of the coupling, thus forming a fluid-tight joint, but which may be readily turned, owing to the antifriction-ring 6 reducing the friction sufficiently to allow the same.

The ring 6 can be made of any width desired to secure the desideratum of a tight joint, yet sufficiently free from friction to form a flexible or movable joint between the two sections 1 and 7 of the pipe.

Having thus described the invention, what I desire to secure by United States Letters Patent is—

1. In a pipe-coupling, the combination of the male part 8; the cup 10 secured to the male part; the female part 2; the pipe 1; and the cup 4 secured to the said pipe.

2. In a pipe-coupling, the combination of the male part 8; the cup 10 secured to the male part; the female part 2; the pipe 1; the cup 4 secured to the pipe, and the antifriction-ring 6 located between the said cups.

3. In a pipe-coupling, the combination of the male part 8; the female part 2; flexible means to insure a movable fluid-tight joint between the two, and a ring 6 located between the said means to reduce the friction therebetween.

In testimony whereof I affix my signature in the presence of two witnesses.

ROBERT A. REGESTER.

Witnesses:
E. L. WOODSIDE,
A. G. DECKER.